(12) United States Patent
Takizawa

(10) Patent No.: US 7,829,960 B2
(45) Date of Patent: Nov. 9, 2010

(54) SEMICONDUCTOR PRESSURE SENSOR, METHOD FOR PRODUCING THE SAME, SEMICONDUCTOR DEVICE, AND ELECTRONIC APPARATUS

(75) Inventor: Teruo Takizawa, Matsumoto (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 12/328,991

(22) Filed: Dec. 5, 2008

(65) Prior Publication Data
US 2009/0146230 A1    Jun. 11, 2009

(30) Foreign Application Priority Data
Dec. 10, 2007    (JP)  ............................... 2007-318885

(51) Int. Cl.
*H01L 29/82*    (2006.01)
(52) U.S. Cl. ................ 257/415; 257/419; 257/E27.006
(58) Field of Classification Search ................. 257/108, 257/411, 415, 418, 419, 536, E27.006
See application file for complete search history.

(56) References Cited

U.S. PATENT DOCUMENTS

| | | | |
|---|---|---|---|
| 6,619,133 B1 | 9/2003 | Goshoo et al. | |
| 7,057,248 B2 * | 6/2006 | Sautter et al. | ............... 257/419 |
| 7,071,795 B2 | 7/2006 | Inoue | |

FOREIGN PATENT DOCUMENTS

| | | |
|---|---|---|
| CN | 1292868 | 4/2001 |
| CN | 1617444 | 5/2005 |
| CN | 1790765 | 6/2006 |
| EP | 0496890 | 8/1991 |
| JP | 04-095742 | 3/1992 |
| JP | 04-103177 | 4/1992 |
| JP | 07-27643 | 1/1995 |
| JP | 2007-108161 | 4/2007 |
| WO | WO2007/032259 | 3/2007 |

* cited by examiner

*Primary Examiner*—Hoai v Pham
(74) *Attorney, Agent, or Firm*—Harness, Dickey & Pierce, P.L.C.

(57) ABSTRACT

A semiconductor pressure sensor includes: a first substrate; a buried insulating film laminated on the first substrate; a second substrate laminated on the buried insulating film; a plurality of electrodes including a lower electrode and at least two upper electrodes, the lower electrode being formed on the second substrate; and a piezoelectric film laminated on the lower electrode and having the upper electrodes formed thereon. In the sensor, there is removed at least a portion of a region of the first substrate corresponding to a region of the second substrate including the piezoelectric film and the electrodes.

14 Claims, 13 Drawing Sheets

SEMICONDUCTOR PRESSURE SENSOR, METHOD FOR PRODUCING THE SAME, SEMICONDUCTOR DEVICE, AND ELECTRONIC APPARATUS

BACKGROUND

1. Technical Field

The present invention relates to a semiconductor pressure sensor, a method for producing the semiconductor pressure sensor, a semiconductor device, and an electronic apparatus.

2. Related Art

Recently, in the semiconductor industry, a micro electromechanical system (MEMS) has become increasingly fused with IC devices to accelerate development of various multifunctional semiconductor devices. Among the semiconductor devices, particularly, acceleration sensors, gyro sensors, resonators such as timing devices have been vigorously developed. On the other hand, there are still many problems in fusion and integration of the MEMS devices and complementary metal oxide semiconductor (CMOS) devices, so that various technological solutions are being explored to solve the problems.

Conventional pressure sensors, which are used to detect pressure, are generally of capacitance type, piezo-resistance type, piezoelectric type, and the like. Among them, piezo-resistance type pressure sensors are dominantly used (e.g. See JP-A-1995-027643).

As an example of the capacitance type pressure sensors, FIG. 17 shows a pressure sensor 100 that includes a diaphragm 101 having a predetermined gap. The diaphragm 101 is movable by a pressure difference to detect capacitance changes. Accordingly, power consumption in operation is small, so that the capacitance type pressure sensors are used for a purpose of power consumption reduction. However, such a type of pressure sensor has a low sensitivity of detection. In order to maintain detection sensitivity over a certain level, the diaphragm 101 needs to be made larger, which makes a structure of the sensor more complicated. Thus, for example, in the field of the MEMS as mentioned above, it is difficult to integrate the capacitance type pressure sensor 100 of FIG. 17A with a CMOS circuit or the like detecting pressure applied to the sensor.

Examples of the piezo-resistance type pressure sensor include pressure sensors 110 and 120 shown in FIGS. 17B and 17C. In those sensors, when a bridge resistance 112 on each of semiconductor thin films 111 and 121 receives pressure to cause distortion, a resistance value change is converted into a voltage to be detected. Such a pressure sensor is highly sensitive and can be easily integrated with a CMOS circuit or the like when applied in the field of the MEMS. However, the piezo resistance type pressure sensors 110 and 120, which require allowing a constant electric current to continue to pass through the bridge resistance 112, are not desirable in terms of power consumption reduction. In particular, to ensure improvement of performance accuracy in a high-temperature range, a constant current circuit or the like is additionally needed, thereby resulting in a further increase in power consumption.

The piezoelectric type pressure sensor detects a voltage displacement occurring, for example, when a piezoelectric film on a diaphragm formed of a thinned silicon substrate is distorted by pressure applied. Consequently, the sensor achieves low power consumption and can be easily integrated with a CMOS circuit or the like in applications of the MEMS field. However, conventional piezoelectric pressure sensors have a low sensitivity in pressure detection and particularly cannot be used for purposes of detection of minute pressure changes.

Therefore, there has been a demand for a semiconductor pressure sensor that can facilitate integration with a semiconductor circuit such as a CMOS circuit, can reduce power consumption, and can exhibit a high sensitivity in pressure detection.

SUMMARY

The present invention has been accomplished to solve the above problems. An advantage of the invention is to provide a semiconductor pressure sensor that is easily integrated with a semiconductor circuit such as a CMOS circuit to enable pressure to be detected with highly sensitivity, as well as to provide a method for producing the semiconductor pressure sensor. Another advantage of the invention is to provide a semiconductor device and an electronic apparatus using the semiconductor pressure sensor.

A semiconductor pressure sensor according to a first aspect of the invention includes a first substrate; a buried insulating film laminated on the first substrate; a second substrate laminated on the buried insulating film; a plurality of electrodes including a lower electrode and at least two upper electrodes, the lower electrode being formed on the second substrate; and a piezoelectric film laminated on the lower electrode and having the upper electrodes formed thereon, wherein there is removed at least a portion of a region of the first substrate corresponding to a region of the second substrate including the piezoelectric film and the electrodes.

In the semiconductor pressure sensor of the first aspect structured as above, the electrodes include the lower electrode on the second substrate and the upper electrodes formed on the piezoelectric film on the lower electrode. The structure allows detecting potential changes in the piezoelectric film based on a plurality of piezoelectric capacitances. Thus, the semiconductor pressure sensor obtained exhibits a high pressure-detection sensitivity at a low power consumption, and can be easily integrated with a semiconductor circuit.

Preferably, in the semiconductor pressure sensor of the first aspect, the upper electrodes include a center electrode disposed at an approximately center position of an electrode-forming region on the piezoelectric film and an outside electrode spaced apart from the center electrode to be formed so as to surround the center electrode.

In the semiconductor pressure sensor structured as above, since the outside electrode is provided apart from the center electrode so as to surround the center electrode, minute potential changes in the piezoelectric film can be detected, thus further improving pressure detection sensitivity.

Preferably, in the semiconductor pressure sensor above, the outside electrode includes a plurality of outside electrodes.

In the semiconductor pressure sensor structured as above, providing the plurality of outside electrodes leads to further improvement in the pressure detection sensitivity.

Preferably, in the semiconductor pressure sensor above, the outside electrode is formed in a ring shape.

In the semiconductor pressure sensor structured as above, forming the ring-shaped outside electrode further ensures detection of minute potential changes in the piezoelectric film, thus further improving the pressure detection sensitivity.

Preferably, in the semiconductor pressure sensor of the first aspect, the first and the second substrates are made of silicon or a semiconductor material similar to silicon.

In the semiconductor pressure sensor structured as above, using the first and the second substrates made of silicon or a semiconductor material similar thereto facilitates integration of the sensor and a semiconductor circuit.

Preferably, in the semiconductor pressure sensor of the first aspect, the buried insulating film is a silicon oxide film or a semiconductor oxide film similar to the silicon oxide film.

In the semiconductor pressure sensor structured as above, using one of the above-mentioned oxide films as the buried insulating film facilitates a process of producing the sensor integrated with a semiconductor circuit such as a CMOS circuit.

A semiconductor device according to a second aspect of the invention includes: a pressure sensor region including a first substrate, a buried insulating film laminated on the first substrate, a second substrate laminated on the buried insulating film, a plurality of electrodes including a lower electrode and at least two upper electrodes, the lower electrode being formed on the second substrate, a piezoelectric film laminated on the lower electrode and having the upper electrodes formed thereon, in which there is removed at least a portion of a region of the first substrate corresponding to a region of the second substrate including the piezoelectric film and the electrodes; and a semiconductor circuit formed on the buried insulating film, the semiconductor circuit being electrically connected to each of the electrodes to detect pressure applied to the piezoelectric film so as to output a pressure detection signal.

The semiconductor device of the second aspect includes the pressure sensor region. In the sensor region, the piezoelectric film and the electrodes are laminated above or on the second substrate; there is removed the at least a portion of the region of the first substrate corresponding to the region of the second substrate including the piezoelectric film and the electrodes; and as the above electrodes, the lower electrode is formed on the second substrate and the upper electrodes are formed on the piezoelectric film on the lower electrode. The structure allows detecting potential changes in the piezoelectric film based on a plurality of piezoelectric capacitances. Thus, the semiconductor device can achieve power consumption reduction and a high sensitivity of pressure detection. Additionally, the semiconductor circuit is formed on the buried insulating film to detect pressure applied to the piezoelectric film. Accordingly, the buried insulating film acts as an etching stopper, thereby enabling the at least a portion of the region of the first substrate to be removed by etching after forming the piezoelectric film and the electrodes included in the pressure sensor region and the semiconductor circuit. This results in facilitation of a production process of the semiconductor device.

Preferably, in the semiconductor device of the second aspect, the upper electrodes include a center electrode disposed at an approximately center position of an electrode-forming region on the piezoelectric film and an outside electrode spaced apart from the center electrode to be formed so as to surround the center electrode.

In the semiconductor device structured as above, since the upper electrodes are provided apart from the center electrode so as to surround the center electrode, minute potential changes in the piezoelectric film can be detected, thus further improving pressure detection sensitivity in the pressure sensor region.

Preferably, in the semiconductor device above, the outside electrode includes a plurality of outside electrodes.

In the semiconductor device structured as above, providing the plurality of outside electrodes further improves the pressure detection sensitivity.

Preferably, in the semiconductor device above, the outside electrode is formed in a ring shape.

In the semiconductor device structured as above, forming the ring-shaped outside electrode further ensures detection of minute potential changes in the piezoelectric film, thus further improving the pressure detection sensitivity.

Preferably, in the semiconductor device of the second aspect, the first and the second substrates are made of silicon or a semiconductor material similar to silicon.

In the semiconductor device structured as above, using the first and the second substrates made of silicon or a semiconductor material similar thereto facilitates integration of the pressure sensor region and a semiconductor circuit.

Preferably, in the semiconductor device of the second aspect, the buried insulating film is a silicon oxide film or a semiconductor oxide film similar to the silicon oxide film.

In the semiconductor device structured as above, using one of the above-mentioned oxide films as the buried insulating film facilitates a process of producing the semiconductor device by integrating the pressure sensor region with the semiconductor circuit.

A method for producing a semiconductor pressure sensor according to a third aspect of the invention includes laminating a buried insulating film on a first substrate; laminating a second substrate on the buried insulating film; laminating a lower electrode on the second substrate; laminating a piezoelectric film on the lower electrode by a reactive sputtering method; laminating at least two upper electrodes on the piezoelectric film laminated on the lower electrode; and removing at least a portion of a region of the first substrate corresponding to a region of the second substrate including the piezoelectric film and the electrodes by etching using the buried insulating film as an etching stopper.

In the method for producing a semiconductor pressure sensor of the third aspect, the piezoelectric film is formed by reactive sputtering. Accordingly, controlling crystal orientation allows efficiently forming the piezoelectric film having desired alignment properties. Additionally, in the production method above, the at least a portion of the region of the first substrate corresponding to the region of the second substrate including the piezoelectric film and the electrodes is removed by etching using the buried insulating film as the etching stopper. This can increase controllability of thin-film thickness upon removal of the portion of the first substrate by deep etching.

An electronic apparatus according to a fourth aspect of the invention includes the semiconductor pressure sensor of the first aspect or the semiconductor device of the second aspect.

The electronic apparatus of the fourth aspect includes the semiconductor pressure sensor or the semiconductor device, and thus can be made compact and exhibits improved performance characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
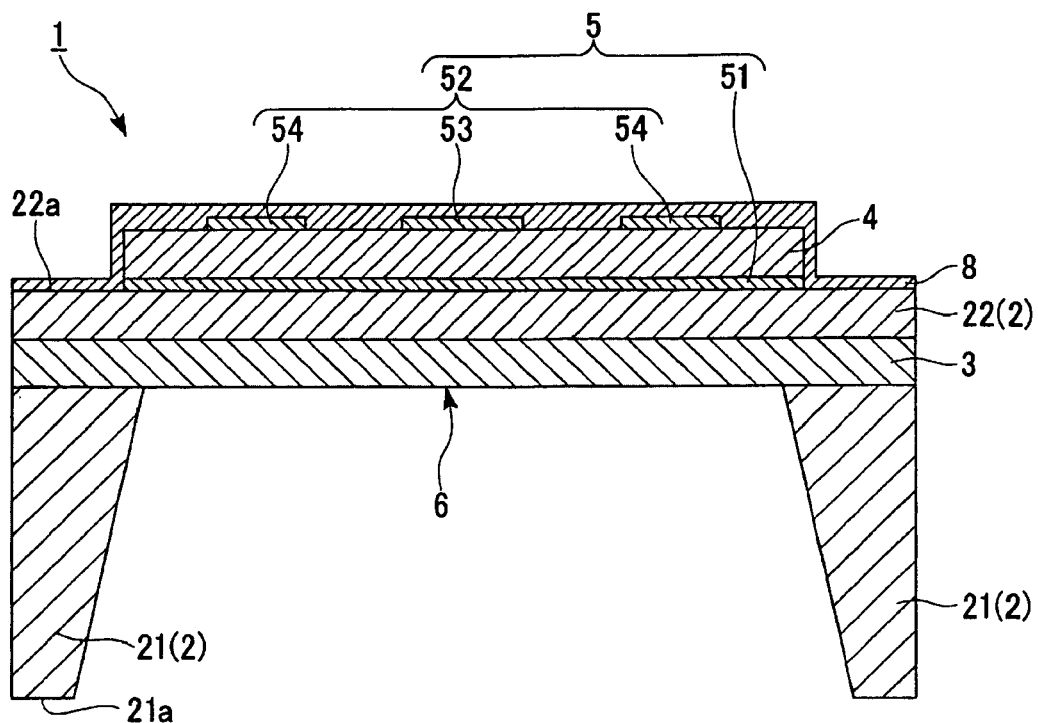
FIG. 1 is a schematic cross-sectional view showing a semiconductor pressure sensor according to a first embodiment of the invention.
Figure 2:
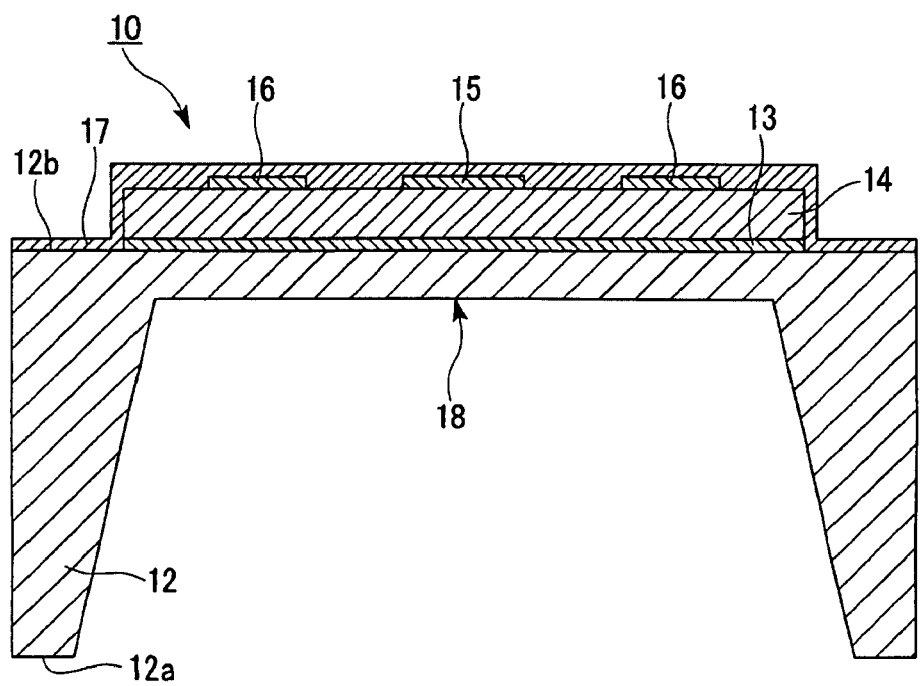
FIG. 2 is a schematic sectional view showing a semiconductor pressure sensor according to a second embodiment of the invention.
Figure 4A:
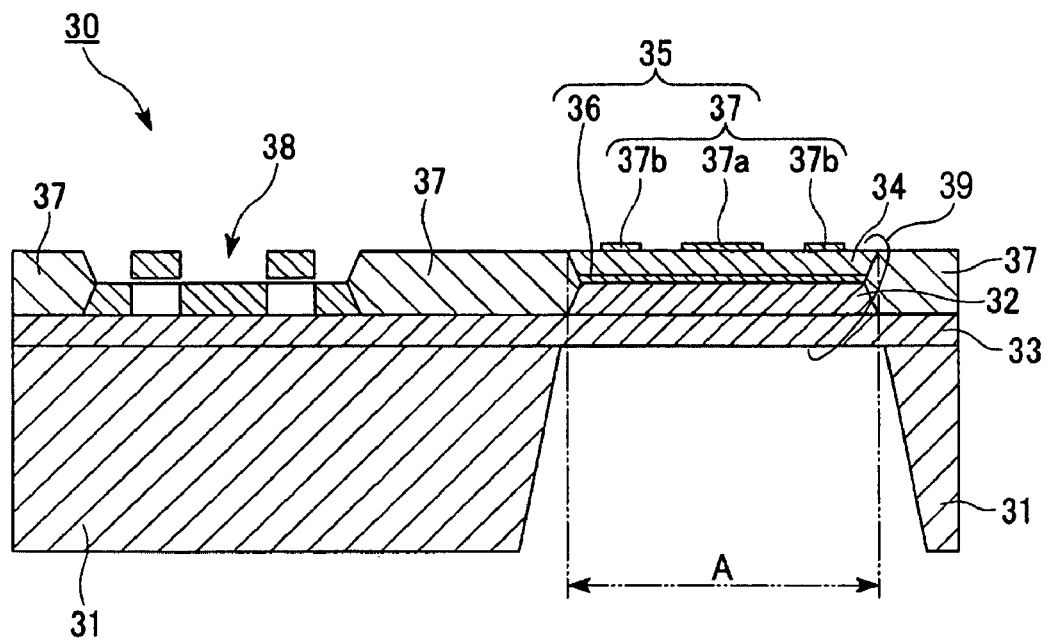
FIGS. 4A and 4B are a schematic cross-sectional view and a plan view showing a semiconductor device according to an embodiment of the invention.
Figure 4B:
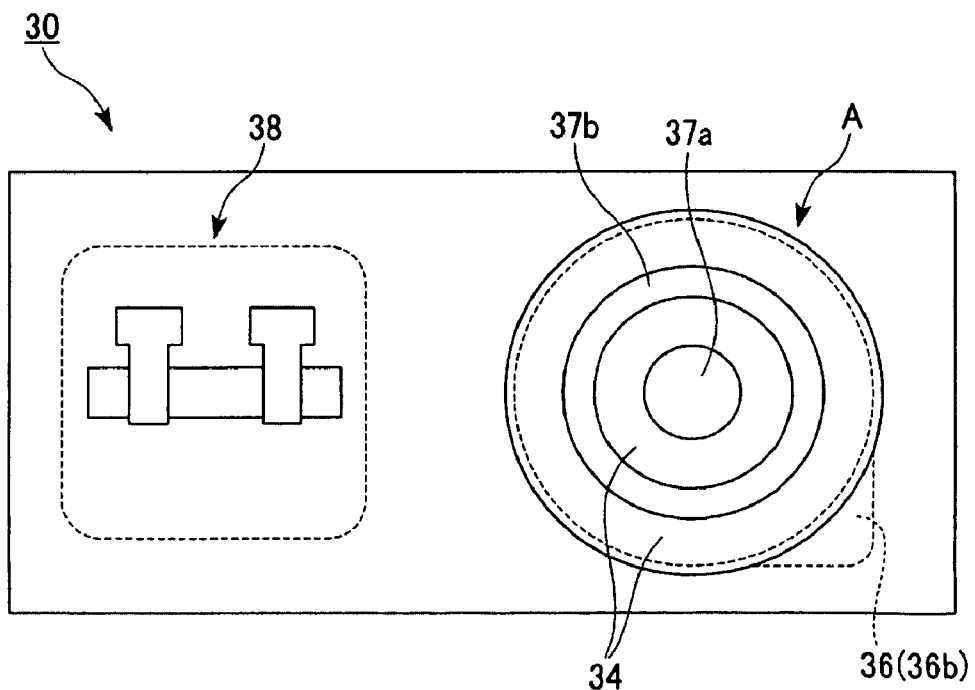
Figure 5:
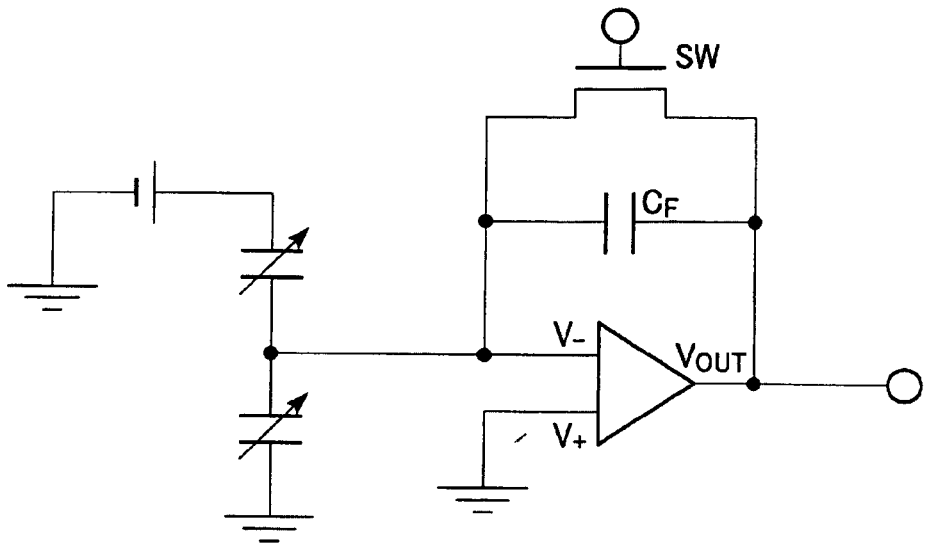
FIG. 5 is a schematic diagram showing an equivalent circuit of the semiconductor pressure sensor connected to the detection circuit in FIG. 3A.

Hereinafter, embodiments of the invention will be described by referring to the drawings according to needs. FIG. 1 is a schematic cross-sectional view of a semiconductor pressure sensor according to a first embodiment of the invention. FIG. 2 is a schematic cross-sectional view of a semiconductor pressure sensor according to a second embodiment of the invention. FIG. 3 is a schematic diagram showing an example of a semiconductor circuit that detects pressure applied to the semiconductor pressure sensor according to the first embodiment. FIGS. 4A and 4B are a schematic cross-sectional view and a plan view showing a semiconductor device according to an embodiment of the invention. FIG. 5 is a schematic diagram showing an equivalent circuit obtained by connecting the semiconductor pressure sensor of the first embodiment to the semiconductor circuit. FIGS. 6A to 14 are schematic diagrams illustrating relationships between a piezoelectric film, a lower electrode, and upper electrodes included in semiconductor pressure sensors according to embodiments of the invention and a plurality of piezoelectric capacitances obtained by the piezoelectric film and the lower and upper electrodes. FIGS. 15A to 15I are step diagrams illustrating an example of the method for producing a semiconductor pressure sensor according to a fifth embodiment of the invention. FIG. 16 is a schematic diagram showing a watch-type electronic apparatus as an example of an electronic apparatus according to an embodiment of the invention. The drawings referred to in the description below are used to explain the semiconductor pressure sensors and the method for producing the sensor, the semiconductor device, and the electronic apparatus. Dimensions (e.g. widths and thicknesses) and proportion of respective portions shown in the drawings are made different from those in actual products.

1. Semiconductor Pressure Sensor 1-1. Multilayer Structure of the Semiconductor Pressure Sensor A semiconductor pressure sensor 1 schematically shown in FIG. 1 includes a first substrate 21; a buried oxide film (a buried insulating film) 3 laminated on the first substrate 21; a second substrate 22 laminated on the buried oxide film 3; a plurality of electrodes 5 including a lower electrode 51 and at least two upper electrodes 52, the lower electrode 51 being formed on the second substrate 22; a piezoelectric film 4 laminated on the lower electrode 51 and having the upper electrodes 52 formed thereon; and a cover layer 8 covering the second substrate 22 and the respective layers formed on and above the second substrate 22. Additionally, there is removed at least a portion of a region of the first substrate 21 corresponding to a region of the second substrate 22 including the piezoelectric film and the electrodes 54.

The semiconductor pressure sensor 1 of the embodiment structured as above is a piezoelectric pressure sensor.

The first and the second substrates 21 and 22 are each a semiconductor support substrate made of monocrystalline silicon. As shown in the drawing, the second substrate 22 is laminated on the buried oxide film 3 disposed on the first substrate 21, thereby constituting a substrate 2 having a so-called silicon-on-insulator (SOI) structure. The first and the second substrates 21 and 22 may be made of a semiconductor material similar to silicon.

On a surface 22a of the second substrate 22 is formed the lower electrode 51 on which there is formed the piezoelectric film 4 on which there are disposed the upper electrodes 52. As shown in FIG. 2, deep etching is performed on the first substrate 21 to remove a portion equivalent to an almost whole area of the region of the first substrate 21 corresponding to the region of the second substrate 22 including the piezoelectric film 4 and the electrodes 5, whereby the buried oxide film 3 is exposed from a back surface 21a of the first substrate 21. As a result, there is formed a diaphragm 6 that includes a portion of the buried oxide film 3 and a portion of the second substrate 22 corresponding to the removed region of the first substrate 21.

The buried oxide film 3 can be made of a material well-known in the relevant field, without any restriction, and may be a silicon oxide film, a silicon nitride film, a semiconductor oxide film similar to either of them, or the like, which can be formed on the first substrate 21 by a chemical vapor deposition (CVD) process or the like. In such a case, the second substrate 22 may be made of polycrystalline silicon by the CVD process.

The semiconductor pressure sensor 1 includes the substrate 2 having the above-mentioned SOI structure. Thus, when the at least a portion of the region of the first substrate 21 is removed by deep etching as described, the buried oxide film 3 acts as an etching stopper. This structure can further improve controllability of film thickness of the diaphragm 6 that is corresponding to the at least a portion of the region of the first substrate 21 removed by etching and that is formed as a thin film constituted of the second substrate 22 and the buried oxide film 3.

In detection of pressure applied to the semiconductor pressure sensor 1, distortion caused by the applied pressure allows a change in an amount of charge in the piezoelectric film 4. In FIG. 1, the piezoelectric film 4 is laminated on the lower electrode 51 formed on the surface 22a of the second substrate 22. Additionally, the piezoelectric film 4 shown in the drawing is formed into an approximately round shape, on which there are formed a center electrode 53 and an outside electrode 54 as the upper electrodes 52.

The piezoelectric film 4 can be made of any well-known piezoelectric material exhibiting a piezoelectric mechanism, without any restriction. In particular, there may be suitably used materials with a hexagonal wurtzite crystal structure made of group III-V or III-VI elements that tend to be aligned in a C-axis direction. Examples of such materials include zinc oxide (ZnO), aluminum nitride (AlN), and lead zirconate titanate (PZT) having a perovskite structure. In the present embodiment, any of the materials mentioned above can be deposited by a reactive sputtering method, which will be described in detail below, so as to form the piezoelectric film 4 serving as a film providing a desired alignment and having a desired piezoelectric constant.

The electrodes 5 are used to detect a voltage displacement occurring in the piezoelectric film 4, and as described above, includes the lower electrode 51 formed on the surface 22a of the second substrate 22 and the upper electrodes 52 formed on the piezoelectric film 4 laminated on the lower electrode 51.

Although not shown in FIG. 1, the lower electrode 51 includes a terminal portion 51b that is to be connected to a contact electrode described below, as shown in a plan view of FIG. 3B. In FIG. 3B, the terminal portion 51b is formed to be protruded so as to be exposed from an outer periphery of the approximately round piezoelectric film 4.

The upper electrodes 52 exemplified in the drawing includes the center electrode 53 and the outside electrode 54 that is spaced apart from the center electrode 53 to be formed in a ring shape so as to surround the center electrode 53.

The electrodes 5 can be made of any well-known metal, without any restriction. Suitable examples of such a metal include platinum (Pt), aluminum (Al), molybdenum (Mo), titanium nitride (TiN), and ruthenium (Ru).

As described above, the semiconductor pressure sensor 1 of the present embodiment is structured such that the upper electrodes 52 include the center electrode 53 and the outside electrode 54. Accordingly, a piezoelectric capacitance obtained by the piezoelectric film 4 between the lower and the center electrodes 51 and 53 is different from a piezoelectric capacitance obtained by the piezoelectric film 4 between the lower and the outside electrodes 51 and 54. Consequently, the semiconductor pressure sensor 1 has the two different piezoelectric capacitances.

Figure 3A:
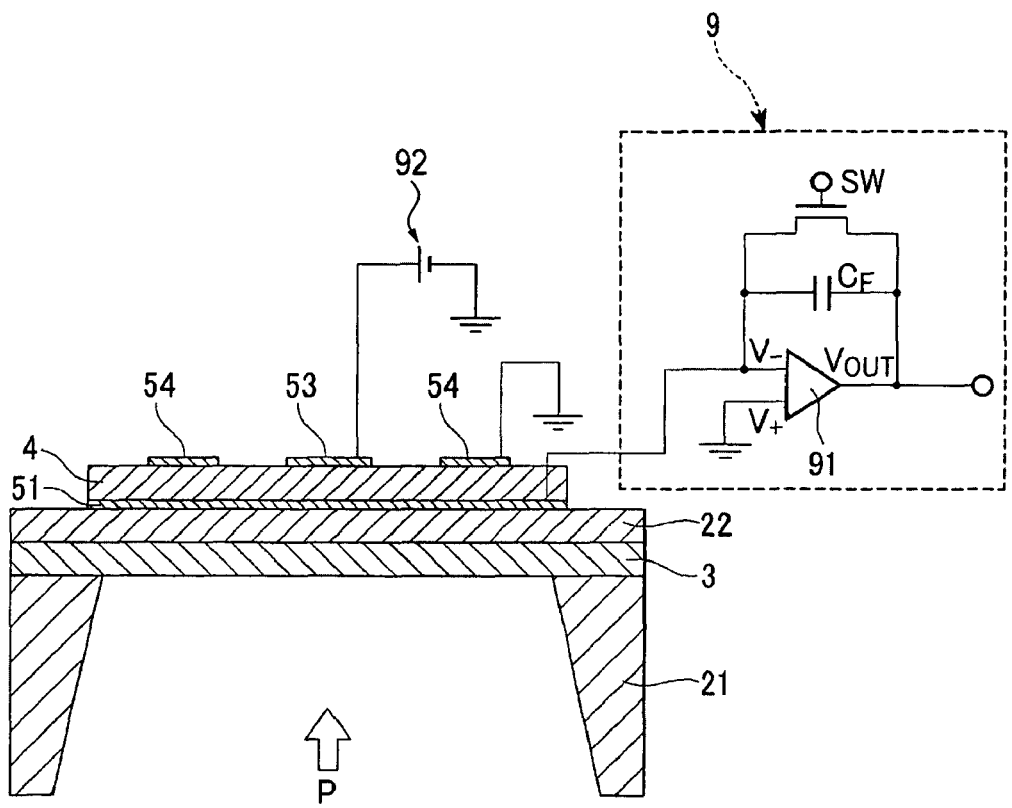
FIG. 3A is a cross-sectional view of the semiconductor pressure sensor according to the first embodiment and a schematic diagram showing an example of a detection circuit that detects pressure applied to the sensor.
Figure 3B:
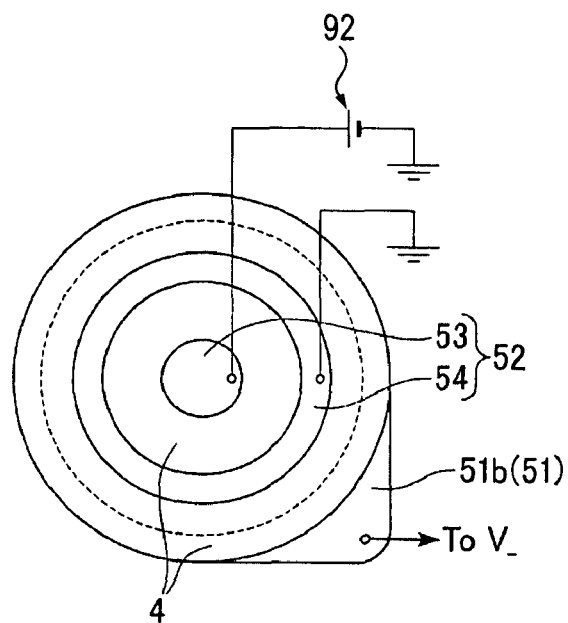
FIG. 3B is a plan view of the semiconductor pressure sensor as it appears when viewed from an upper side in FIG. 3A.

As shown in FIGS. 3A and 3B, connecting electrically the respective electrodes to the detection circuit 9 described below allows circuits generating the two different piezoelectric capacitances to be connected to each other in series, as shown in an equivalent circuit of FIG. 5. Under the condition, a predetermined voltage is applied to the piezoelectric film 4. Then, upon application of pressure to the piezoelectric film 4, there occurs a change in an internal electric field of the piezoelectric film 4. In this case, there is detected a voltage displacement inside the piezoelectric film 4 occurring based on the two different piezoelectric capacitances that are generated between the lower electrode 51 and the center electrode 53 and between the lower electrode 51 and the outside electrode 54 to obtain a voltage difference. This allows detection of minute voltage displacement occurring inside the piezoelectric film 4, thus enabling highly sensitive detection of pressures.

For pressure detection using the semiconductor pressure sensor 1 of the embodiment, the detection circuit 9 can be used. For example, the detection circuit 9 is constituted of a switched capacitor charge integrator circuit using a feedback capacitor $C_F$, as shown n FIG. 3A. The detection circuit 9 includes the feedback capacitor $C_F$ and an operational amplifier 91, where the lower electrode 51 under the piezoelectric film 4 is connected to terminal V− of the operational amplifier 91; the center electrode 53 arranged on the piezoelectric film 4 is connected to a positive polarity side of a power supply 92; and the outside electrode 54 is connected to terminal V+ of the operational amplifier 91. The operational amplifier 91 compares a voltage value of the outside electrode 54 with a voltage division value output from the lower electrode 51 to detect a voltage difference between the lower and the center electrodes 51 and 53 and between the lower and the outside electrodes 51 and 54 so as to output a pressure detection signal from terminal Vout of the operational amplifier 91.

The cover layer 8 is, as described above, a protective cover layer provided to cover the substrate 2 and the respective layers formed on the substrate 2. The cover layer 8 can be made of silicon oxide, silicon nitride, or the like by using the well-known CVD process.

Next will be described in detail a principle of pressure detection using the semiconductor pressure sensor 1 and the detection circuit 9.

Initially, a positive bias is applied to the center electrode 51, and a ground voltage GND is applied to the outside electrode 54. Under the condition, when pressure is applied to the diaphragm 6 from the back surface 21a of the first substrate 21, the diaphragm 6 is deformed to impose stress upon the piezoelectric film 4. In this situation, inside the piezoelectric film 4, the internal electric field is changed in response to the imposed stress, thereby causing a voltage displacement inside the piezoelectric film 4. However, a level of the stress generated between the lower and the center electrodes 51 and 53 is different from that of the stress generated between the lower and the outside electrodes 51 and 54. Thus, there is generated an electric charge in accordance with each of the stresses, thereby causing a voltage displacement. As a result, the lower electrode 51 has a potential different from that of the electrode in an unloaded state. The potential is input to the V− of the operational amplifier 91. The operational amplifier 91 having the feedback capacitor $C_F$ outputs a pressure detection signal from the Vout thereof in response to the input potential.

As described above, the semiconductor pressure sensor 1 of the embodiment includes the lower electrode 51, the center electrode 53, and the outside electrode 54. Inside the piezoelectric film 4, the piezoelectric capacitance between the lower and the center electrodes 51 and 53 is different from the piezoelectric capacitance between the lower and the outside electrodes 51 and 54. Accordingly, for a reason described in detail below, highly-sensitive detection of pressures can be performed.

In the semiconductor pressure sensor 1 exemplified in FIG. 1 (Also see FIGS. 3A and 3B), the upper electrodes 52 formed on the piezoelectric film 4 include a pair of the center electrode 53 and the outside electrode 54. However, embodiments of the invention are not restricted to that. For example, there may be provided a plurality of outside electrodes so as to surround the center electrode 53.

In addition, the semiconductor pressure sensor of the embodiment is not restricted to the sensor including the substrate 2 with the SOI structure as the example shown in FIG. 1. For example, as in a semiconductor pressure sensor 10 according to a second embodiment in FIG. 2, a piezoelectric film 14 and respective electrodes may be formed on a substrate 12 made of a silicon monolayer.

The Piezoelectric Film Having Two or More Different Piezoelectric Capacitances Thereinside The semiconductor pressure sensor of the embodiment includes the lower electrode under the piezoelectric film and the upper electrodes arranged on the piezoelectric film as described above to be substantially structured such that two or more different piezoelectric capacitances are generated inside the piezoelectric film, thereby enabling pressure detection to be performed with high sensitivity. A principle of the pressure detection will be described in detail below by referring to FIGS. 6A to 9 according to needs.

In this case, as in schematic diagrams of FIGS. 6A and 6B, a semiconductor pressure sensor C will be described as a sensor according to a third embodiment of the invention. The semiconductor pressure sensor C includes a lower electrode M1 arranged on a substrate Sub1 having a sensing region S formed by removing a portion of the substrate circularly by etching. The lower electrode M1 is provided so as to surround the sensing region S. The sensor C further includes a piezoelectric film P1 disposed on the lower electrode M1, a center electrode 2 as an upper electrode arranged at a center position of an electrode-forming region on the piezoelectric film P1, and an outside electrode M3 formed in a ring shape so as to surround the center electrode M2.

Figure 6A:
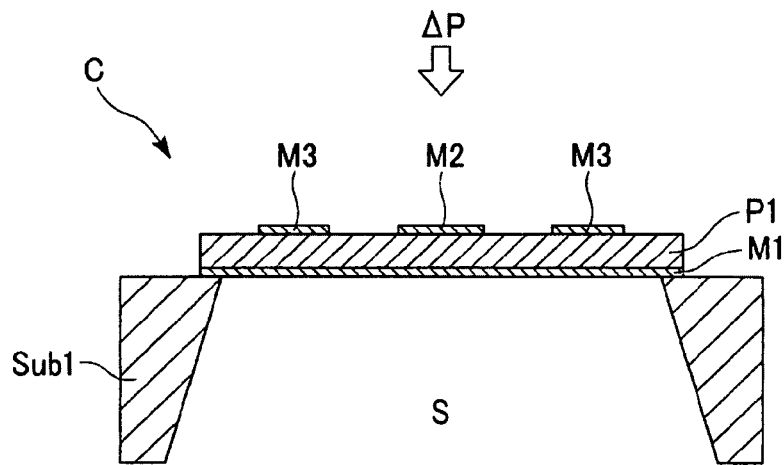
FIGS. 6A and 6B are schematic diagrams showing a structural example of a semiconductor pressure sensor according to a third embodiment of the invention.
Figure 6B:
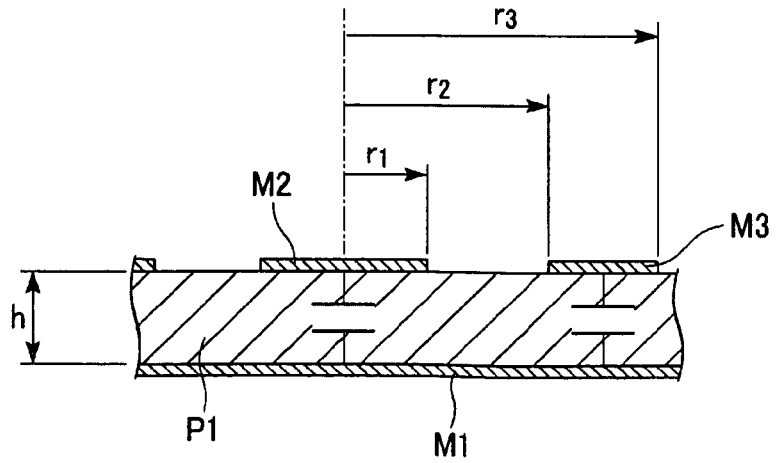
Figure 7:
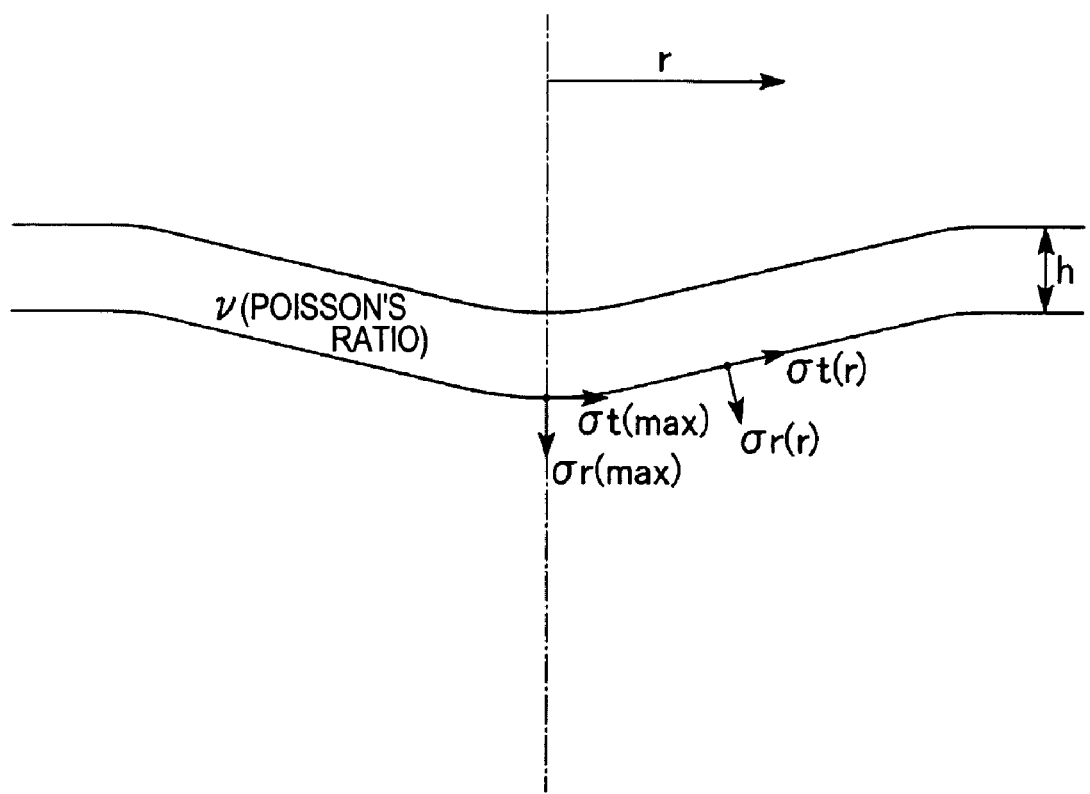
FIG. 7 is a schematic diagram explaining an operational example of the semiconductor pressure sensor according to the third embodiment.

In the semiconductor pressure sensor C shown in FIGS. 6A and 6B, the center electrode M2 is arranged at the center position of the electrode-forming region in such a manner that r1 is a distance from a center M2a of the center electrode M2 to an outer periphery M2b thereof; r2 is a distance from the center M2a of the center electrode M2 to an inner periphery M3a of the outside electrode M3; and a distance r3 represents a distance from the center M2a of the center electrode M2 to an inner periphery M3b of the outside electrode M3.

In the semiconductor pressure sensor C exemplified in FIGS. 6A and 6B, a laminate of the lower electrode M1, the piezoelectric film P1, the center electrode M2, and the outside electrode M3 described above constitutes a circular thin-film diaphragm. When a differential pressure (a gauge pressure) $\Delta P$ is applied to the above thin-film diaphragm, a stress generated on a lower surface of the thin-film diaphragm is represented by a shape shown in a schematic diagram of FIG. 7 and also is analytically calculated by following general equations 1, 2, and 3 (See "The MEMS Handbook" by Mohamed Gad-el-Hak, CRC Press, p. 25-2).

$$\sigma_r = \sigma_0 \left[ (1+v) - \frac{r^2}{a^2}(3+v) \right] \quad \text{Equation 1}$$

$$\sigma_t = \sigma_0 \left[ (1+v) - \frac{r^2}{a^2}(1+3v) \right] \quad \text{Equation 2}$$

$$\sigma_0 = \frac{3\Delta P}{8h^2} \cdot a^2 \quad \text{Equation 3}$$

In the general equations above and also in general equations below, h represents a thickness of the thin film; a represents a radius of the diaphragm; v represents a Poisson's ratio of the thin film; and σr and σt, respectively, represent a stress in a normal direction and a stress in a tangential direction, respectively, at a position indicated by a distance r from a center of the diaphragm to an outer periphery thereof.

Whether $\sigma_r(r)$ and $\sigma_t(r)$ are tensile or compressive depends on the distance r from the center. Furthermore, in this case, a relationship between the Poisson's ratio v and each of stresses $f_r$, $f_t$ is represented by following general equations 4, 5, 6, and 7.

$$f_r = [(1+v) - \tilde{r}^2(3+v)] \quad \text{Equation 4}$$

$$f_t = [(1+v) - \tilde{r}^2(1+3v)] \quad \text{Equation 5}$$

$$\tilde{r} = \frac{r}{a} \quad \text{Equation 6}$$

$$0 \leq \tilde{r} \leq 1 \quad \text{Equation 7}$$

In general equations 4 to 7, the Poisson's ratio is usually in a range indicated by a following inequality: $-1 < v < \frac{1}{2}$.

Figure 8:
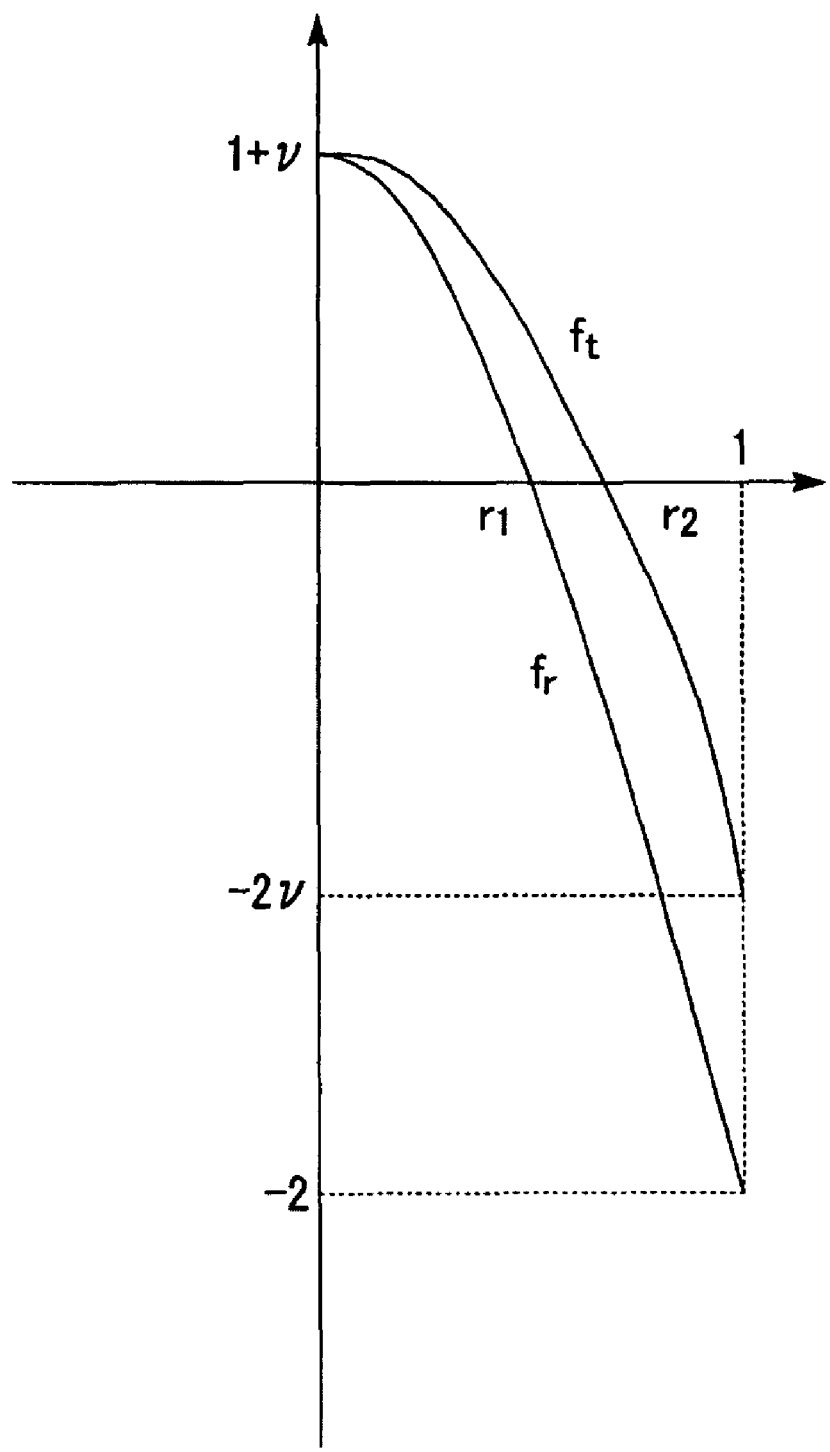
FIG. 8 is a schematic diagram explaining the operational example of the semiconductor pressure sensor according to the third embodiment.
Figure 9:
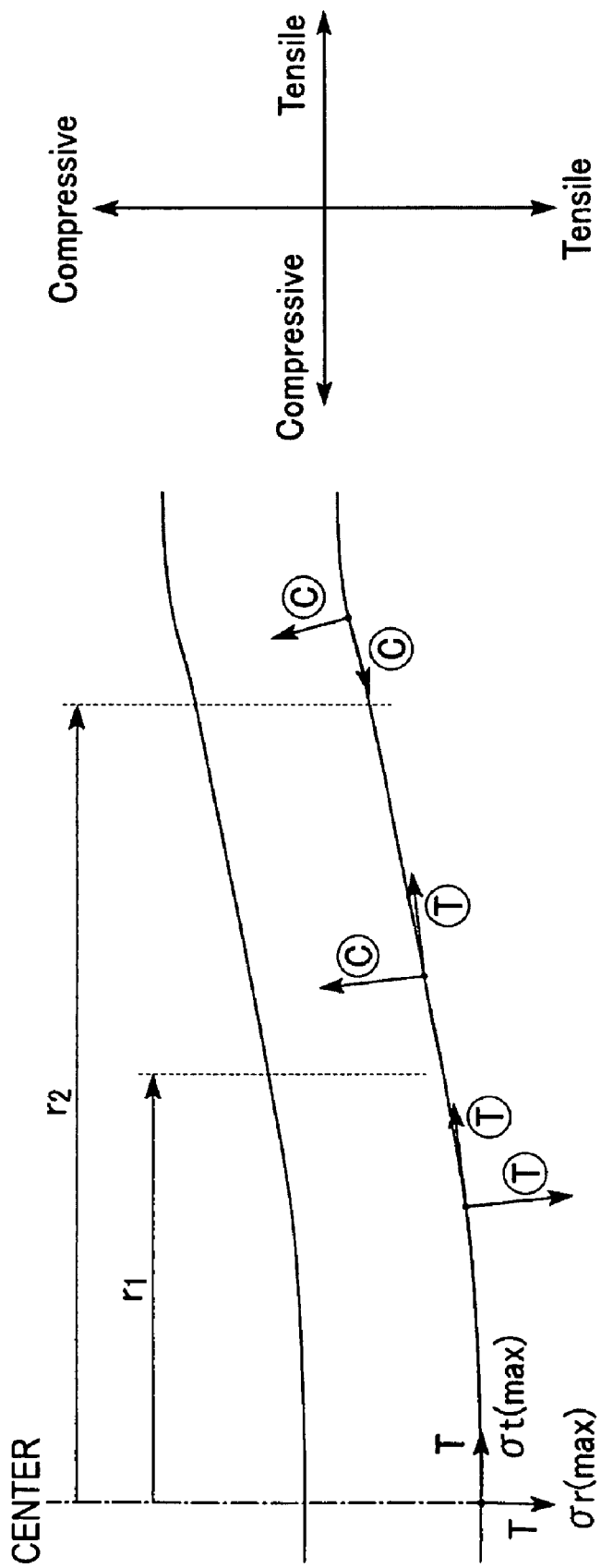
FIG. 9 is a schematic diagram explaining the operational example of the semiconductor pressure sensor according to the third embodiment.

The thin-film diaphragm provided based on the above relationships is shown in a graph of FIG. 8 and a schematic diagram of FIG. 9. In FIG. 9, symbol T represents tensile stress, and symbol C represents compressive stress. In addition, following table 1 shows that whether the stresses become "tensile" or "compressive" depends on the relationship between the distance r from the center of the thin-film diaphragm and the σr and the σt.

TABLE 1

|  | σr | σt |
|---|---|---|
| $0 < r < r_1$ | Tensile | Tensile |
| $r_1 < r < r_2$ | Compressive | Tensile |
| $r_2 < r$ | Compressive | Compressive |

In addition, the relationship between the $r_1$, the $r_2$ and the Poisson's ratio v shown in FIGS. 8 and 9 and Table 1 is represented by following general equations 8 and 9.

$$r_1 = \sqrt{\frac{1+v}{3+v}} \quad \text{Equation 8}$$

$$r_2 = \sqrt{\frac{1+v}{1+3v}} \quad \text{Equation 9}$$

Meanwhile, when the piezoelectric film P1 is made of a material having the hexagonal wurtzite crystal structure (class: 6 mm), such as ZnO or AlN, voltage displacement D (electric flux density) caused by stress is represented by following general equation 10.

$$D = dT \begin{bmatrix} 0 & 0 & 0 & 0 & d_{15} & 0 \\ 0 & 0 & 0 & d_{15} & 0 & 0 \\ d_{31} & d_{31} & d_{33} & 0 & 0 & 0 \end{bmatrix} \begin{bmatrix} T_1 \\ T_2 \\ T_3 \\ T_4 \\ T_5 \\ T_6 \end{bmatrix} \quad \text{Equation 10}$$

$$= \begin{bmatrix} d_{15} T_5 \\ d_{15} T_4 \\ d_{31} T_1 + d_{31} T_2 + d_{33} T_3 \end{bmatrix}$$

In equation 10, an electric field voltage is set to 0; $T_1$ and $T_2$ are equivalent to $\sigma t$; and $T_3$ is equivalent to $-\sigma r$.

Figure 10A:
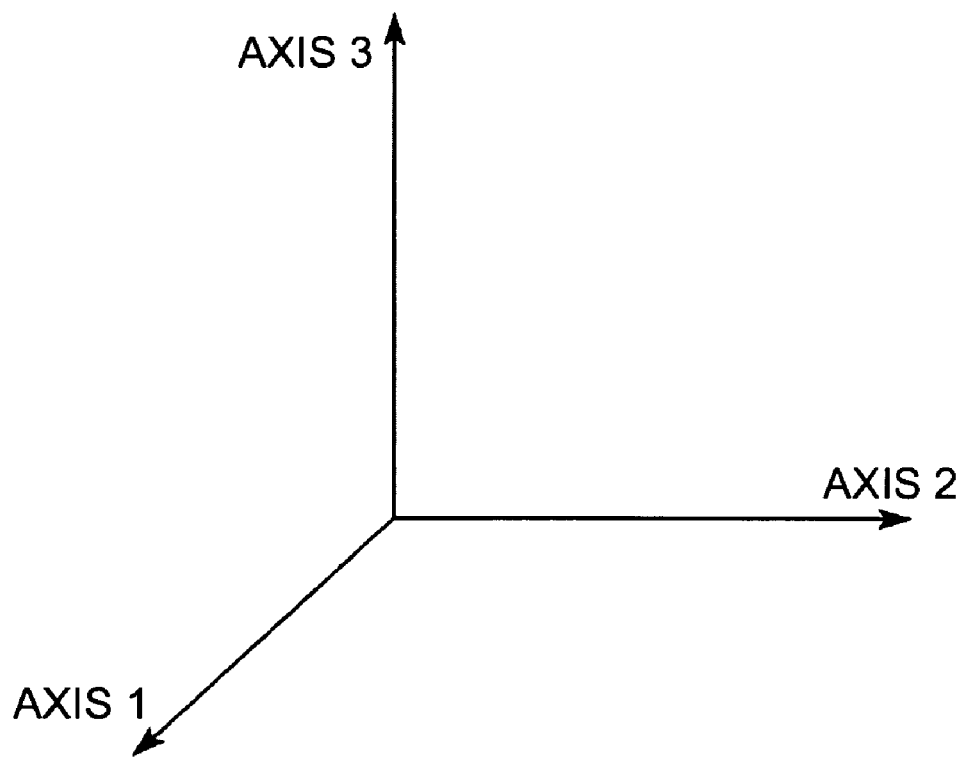
FIGS. 10A and 10B are schematic diagrams explaining the operational example of the semiconductor pressure according to the third embodiment.
Figure 10B:
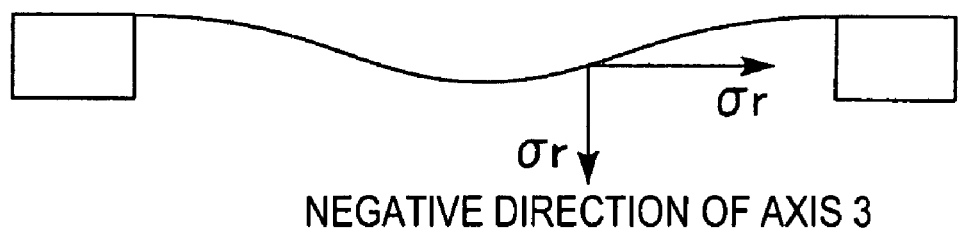
Figure 11:
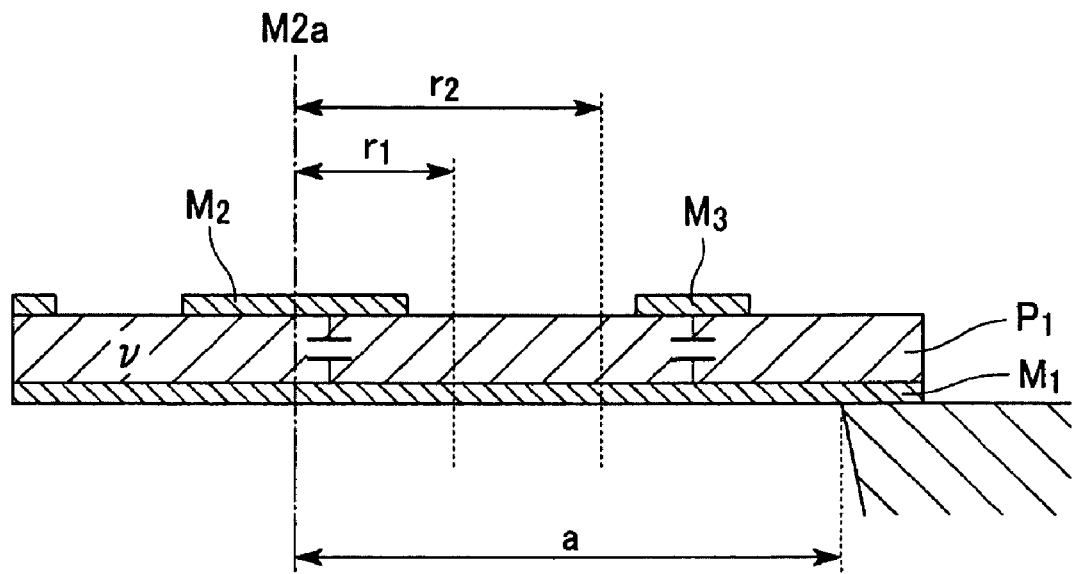
FIG. 11 is a schematic diagram illustrating another structural example of the semiconductor pressure sensor according to the third embodiment.
Figure 12:
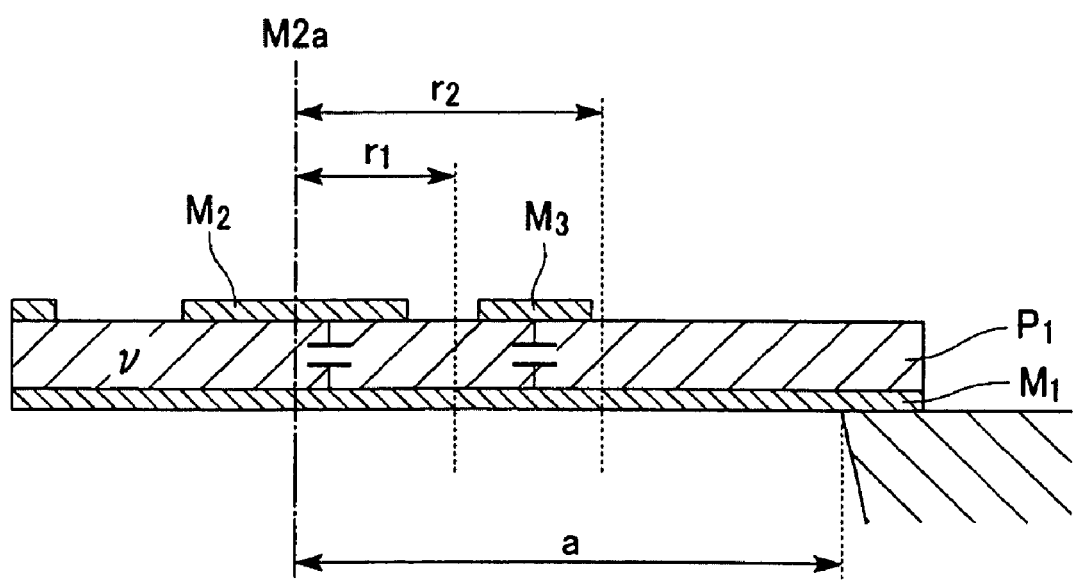
FIG. 12 is a schematic diagram illustrating another structural example of the semiconductor pressure sensor according to the third embodiment.

In the present embodiment, in crystal axis directions shown in schematic diagrams of FIGS. 10A and 10B, only an electric flux density $D_3$ of crystal axis 3 is needed. Then, the density $D_3$ can be obtained by following general equation 11.

$$D_3 = 2d_{31}\sigma_r - d_{33}\sigma_t \quad \text{Equation 11}$$

In general equation 11, when $d_{33}$ is larger than 0 and $d_{31}$ is smaller than 0, a relationship between the values of $\sigma r$, $\sigma t$, and $D_3$ and the distance r from the center of the thin-film diaphragm is represented by following table 2, whereas when $d_{33}$ is larger than 0 and $d_{31}$ is also larger than 0, the relationship therebetween is represented by following table 3.

TABLE 2

|  | $r < r_1$ | $r_1 < r < r_2$ | $r_2 < r$ |
|---|---|---|---|
| $\sigma t$ | + | + | − |
| $\sigma r$ | + | − | − |
| $D_3$ | − | −/+ | + |

TABLE 3

|  | $r < r_1$ | $r_1 < r < r_2$ | $r_2 < r$ |
|---|---|---|---|
| $\sigma t$ | + | + | − |
| $\sigma r$ | + | − | − |
| $D_3$ | −/+ | + | −/+ |

Accordingly, when the piezoelectric film is made of a material ($d_{33}>0$ and $d_{31}<0$), such as AlN or ZnO as described above, minute voltage displacement inside the piezoelectric film P1 can be detected in a following manner. That is, as shown in a schematic diagram of FIG. 11, forming the center electrode M2 such that the distance from the center M2a is equal to or smaller than $r_1$ and forming the outside electrode M3 such that the distance from the center M2a is equal to or larger than $r_2$ allows improving pressure-detection sensitivity.

For the piezoelectric film made of a material ($d_{33}>0$ and $d_{31}>0$), such as $Li_2B_4O_7$ or $LiNbO_3$, a following structure allows detecting minute voltage displacement inside the piezoelectric film P1. That is, as shown in a schematic diagram of FIG. 12, forming the center electrode M2 such that the distance from the center M2a is equal to or smaller than $r_1$ and forming the outside electrode M3 such that the distance from the center M2a is equal to or larger than $r_1$ and equal to or smaller than $r_2$ can improve pressure-detection sensitivity.

Figure 13:
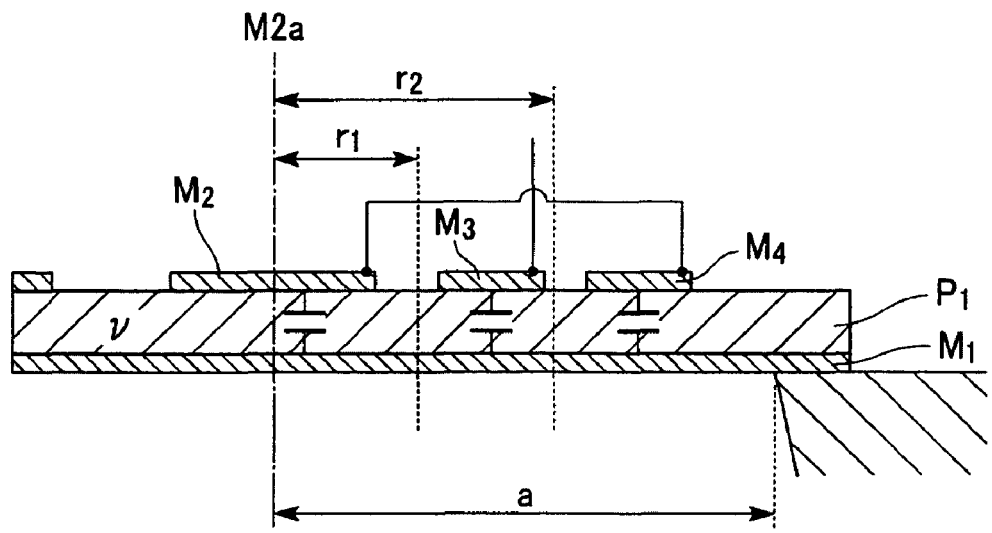
FIG. 13 is a schematic diagram illustrating another structural example of the semiconductor pressure sensor according to the third embodiment.

Additionally, as shown in a schematic diagram of FIG. 13, there may be formed a plurality of outside electrodes, such as two outside electrodes M3 and M4 in the drawing. In this case, for example, the center electrode M2 may be formed such that the distance from the center M2a is equal to or smaller than $r_1$; the outside electrode M3 positioned outside the electrode M2 may be formed such that the distance from the center M2a is equal to or larger than $r_1$ and equal to or smaller than $r_2$; and the outside electrode M4 outside the electrode M3 may be formed such that the distance from center M2a is equal to or larger than $r_2$. This structure allows detecting minute voltage displacement inside the piezoelectric film P1, thereby improving pressure-detection sensitivity.

For convenience of the description as above, the semiconductor pressure sensor C shown in the schematic diagrams of FIGS. 6A and 6B is used as an example in which the portion of the substrate Sub1 corresponding to the sensing region S is removed so as to penetrate through the substrate. However, the above-described principle is also applicable to semiconductor pressure sensors in which a piezoelectric film and respective electrodes are laminated on a thinned region of a substrate, such as those shown in FIGS. 1 and 2.

Figure 14:
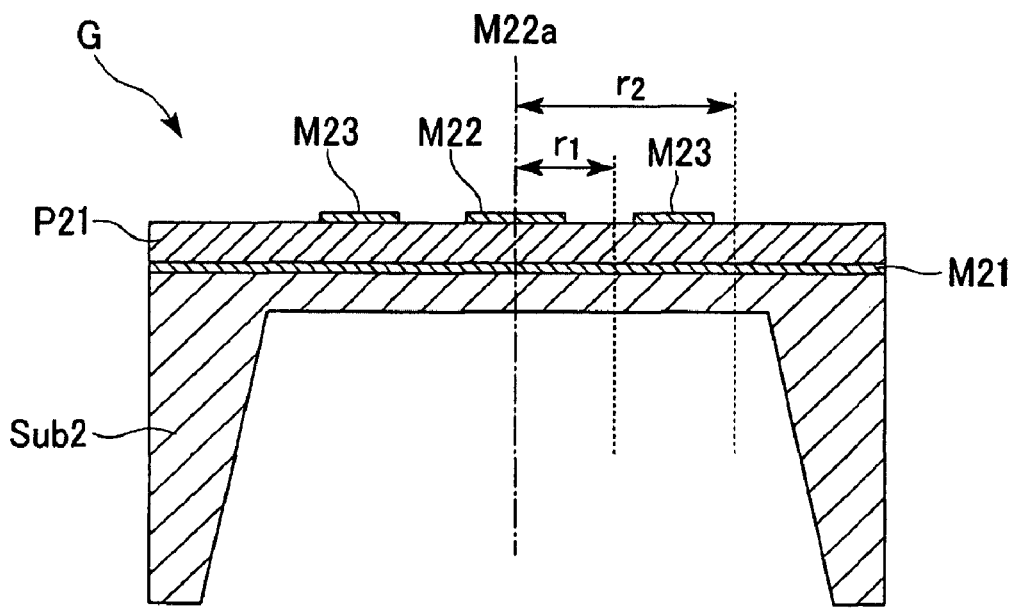
FIG. 14 is a schematic diagram showing a structural example of a semiconductor pressure sensor according to a fourth embodiment of the invention.

For example, FIG. 14 schematically depicts a semiconductor pressure sensor G in which a lower electrode M21 is formed on a substrate Sub2 made of silicon; a piezoelectric film P21 is laminated on the lower electrode M21; and a center electrode M22 and an outside electrode M23 as upper electrodes are laminated on the piezoelectric film P21. In this case, a Poisson's ratio can be approximately calculated by following general equation 12.

$$v_{tot} = \frac{t_1 v_1 + t_2 v_2}{t_1 + t_2} \quad \text{Equation 12}$$

In the above equation, $t_1$ represents a thickness of a thinned portion of the substrate Sub2; $t_2$ represents a thickness of the piezoelectric film P21; $v_1$ represents a Poisson's ratio of the substrate Sub2; and $v_2$ represents a Poisson's ratio of the piezoelectric film P21.

Using general formula 12 allows calculating optimum values for the distances $r_1$ and $r_2$ from a center M22a of the center electrode M22 in the semiconductor pressure sensor G as shown in the schematic diagram of FIG. 14.

Hereinafter, calculation is performed for the distances $r_1$ and $r_2$ required when using ZnO or AlN as the material of the piezoelectric film P1 in the semiconductor pressure sensor C schematically shown in FIGS. 6A and 6B, based on actual property values shown in Table 4 below.

TABLE 4

|  | ZnO | AlN |
|---|---|---|
| $d_{31}$ | −5.43 | −2.65 |
| $d_{33}$ | 11.67 | 5.53 |
| $d_{15}$ | −11.34 | −4.08 |
| $v$ | ~0.37 | ~0.27 |

* See page 319 of "Acoustic Wave Device Technology Handbook".

When the piezoelectric film P1 is made of AlN, the above respective distances $r_1$ and $r_2$ are obtained based on property values of $d_{31}$, $d_{33}$, $d_{15}$, and $v$ shown in Table 4, as in following general equations 13 and 14.

$$r_1 = \sqrt{\frac{1 + 0.27}{3 + 0.27}} = 0.623 \quad \text{Equation 13}$$

$$r_2 = \sqrt{\frac{1 + 0.27}{1 + 0.81}} = 0.838 \quad \text{Equation 14}$$

Thereby, when the piezoelectric film P1 is made of AlN and the sensing region S has a radius of 100 μm, $r_1$ is approximately 62 μm and $r_2$ is approximately 84 μm.

Additionally, when the piezoelectric film P1 is made of ZnO, the respective distances $r_1$ and $r_2$ are obtained based on property values of $d_{31}$, $d_{33}$, $d_{15}$, and $v$ shown in Table 4, as in following general equations 15 and 16.

$$r_1 = \sqrt{\frac{1 + 0.37}{3 + 0.37}} = 0.638 \quad \text{Equation 15}$$

-continued $$r_2 = \sqrt{\frac{1+0.37}{1+1.11}} = 0.806 \quad \text{Equation 16}$$

From general equations 15 and 16, the respective distances $r_1$ and $r_2$ are approximated between when using the piezoelectric film made of AlN and when using the piezoelectric film made of ZnO. Thus, it can be concluded that the center electrode M2 and the outside electrode M3 can be arranged in a similar size relationship between cases of both materials.

Accordingly, based on the principle described using the respective general equations, the semiconductor pressure sensor of the embodiment can detect minute voltage displacement occurring inside the piezoelectric film, thus exhibiting an improved pressure-detection sensitivity.

As described above, the semiconductor pressure sensor of the first embodiment includes the first substrate 21, the buried oxide film 3 laminated on the first substrate 21, the second substrate 22 laminated on the buried oxide film 3, the piezoelectric film 4 laminated on the lower electrode 51 on the second substrate 22, and the upper electrodes 52 laminated on the piezoelectric film 4. Additionally, there is removed the at least a portion of the region of the first substrate 21 corresponding to the region of the second substrate 22 including the piezoelectric film 4 and the electrodes 5. The electrodes 5 include the lower electrode 51 formed on the second substrate 22 and the upper electrodes 52 formed on the piezoelectric film 4. Furthermore, the upper electrodes 52 include the center electrode 53 and the outside electrode 54. The sensor thus structured can detect potential changes in the piezoelectric film 4 based on a plurality of piezoelectric capacitances. As a result, the semiconductor pressure sensor can exhibit low power consumption and can improve pressure-detection sensitivity, as well as can be easily integrated with a semiconductor circuit.

Method for Producing a Semiconductor Pressure Sensor

Next will be described a method for producing a semiconductor pressure sensor according to an embodiment of the invention.

For example, when producing the semiconductor pressure sensor 1 of FIG. 1, the production method according to the embodiment includes laminating the buried insulating film 3 on the first substrate 21; laminating the second substrate 22 on the buried insulating film 3; laminating the lower electrode 51 of the electrodes 5 on the second substrate 22; forming the piezoelectric film 4 on the lower electrode 51 by a reactive sputtering method; forming the at least two upper electrodes 52 of the electrodes 5 on the piezoelectric film 4 formed on the lower electrode 51; and removing the at least a portion of the region of the first substrate 21 corresponding to the region of the second substrate 22 including the piezoelectric film 4 and the electrodes 6 by etching using the buried insulating film 3 as an etching stopper. Additionally, in the method, as the upper electrodes 52, the center electrode 53 is formed at an approximately center of an electrode-forming region E and the ring-shaped outside electrode 54 is formed so as to surround the center electrode 53.

In the method of the present embodiment, deep etching is performed on the back surface 21a of the first substrate 21. Thereby, an almost entire area of the region of the first substrate 21 corresponding to the region of the second substrate 22 including the piezoelectric film 4 and the lower electrode 51 is removed to expose the buried oxide film 3 from the back surface 21a. In this manner, the portions of the buried oxide film 3 and the second substrate 22 corresponding to the removed portion of the first substrate 21 are formed as the diaphragm 6.

Next will be described an example of steps to produce a semiconductor pressure sensor by using the production method of the present embodiment, with reference to schematic diagrams shown in FIGS. 15A to 15I. FIGS. 15A to 15I illustrate a production process of a semiconductor pressure sensor 7 (See FIG. 15I).

First, as shown in FIG. 16A, there is prepared an SOI substrate 71 in which a buried oxide film 71b having a thickness of 1 to 5 µm is provided between a first silicon substrate 71a having a thickness of approximately 300 µm and a second silicon substrate 71c having a thickness of 1 to 40 µm. For example, the buried oxide film 71b may be formed by bonding a silicon wafer having a silicon oxide film formed thereon with another silicon wafer and then removing an unnecessary part of the silicon film by grinding, etching, or the like.

While the method of the present embodiment uses the SOI substrate 71, the substrate of the embodiment is not specifically restricted to that. For example, there may be used a substrate on which a thermal oxide film is formed on a silicon substrate, and furthermore, a polycrystalline silicon layer is formed with a thickness of a few µm.

Figure 15A:
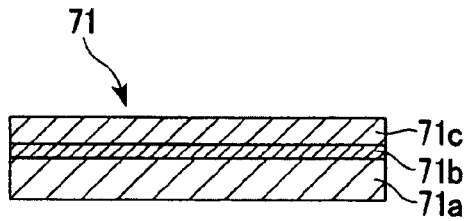
FIGS. 15A to 15I are schematic step diagrams illustrating a method for producing a semiconductor pressure sensor according to an embodiment of the invention.
Figure 15F:
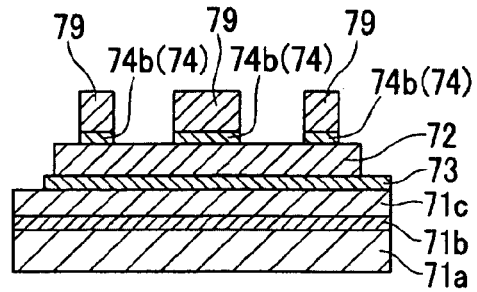
Figure 15B:
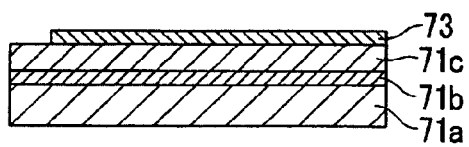
Figure 16:
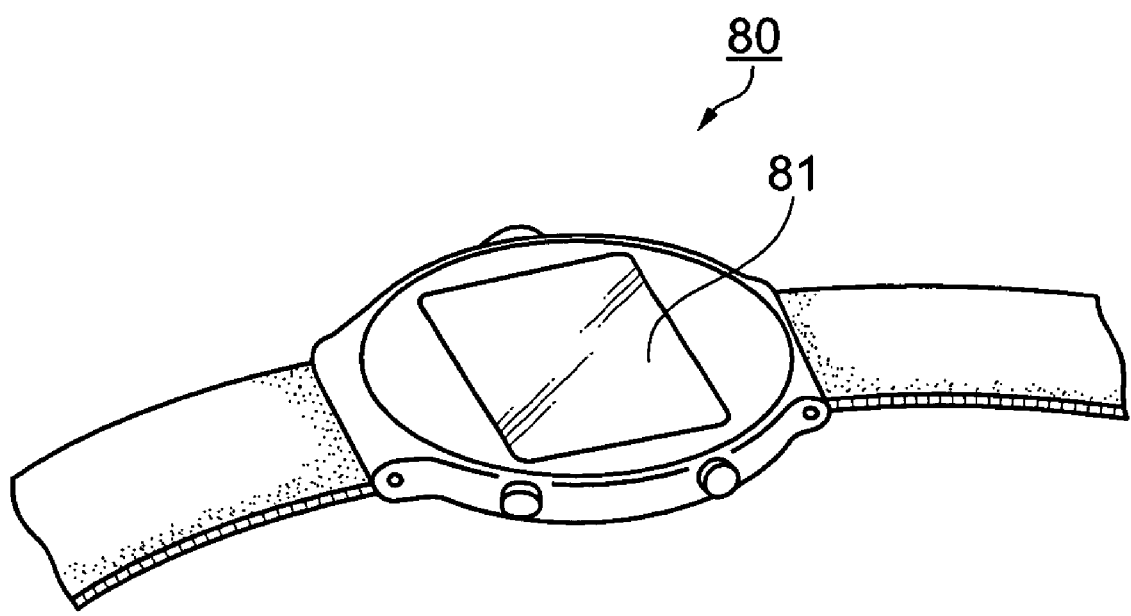
FIG. 16 is a schematic diagram showing a watch-type electronic apparatus as an example of an electronic apparatus according to an embodiment of the invention.
Figure 17A:
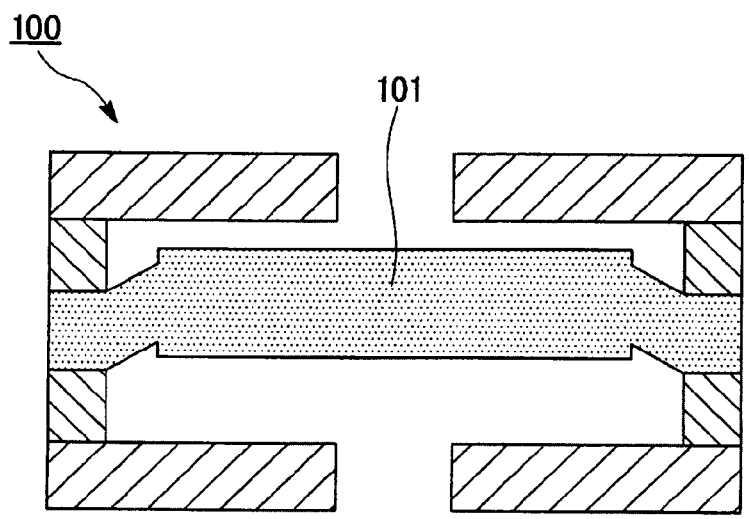
FIGS. 17A to 17C are schematic diagrams showing conventional pressure sensors.
Figure 17B:
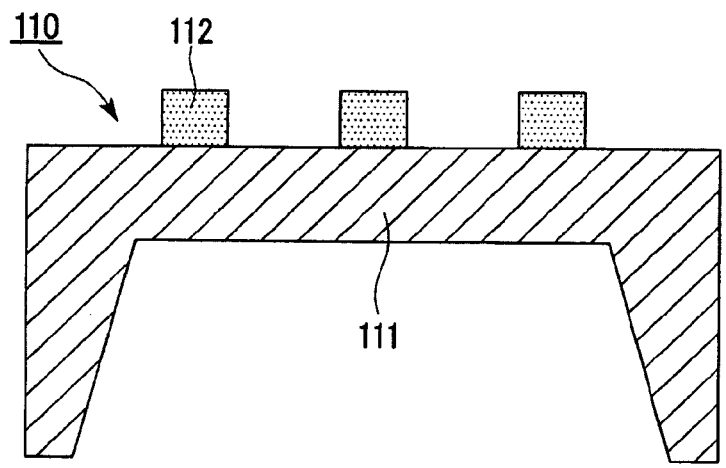
Figure 17C:
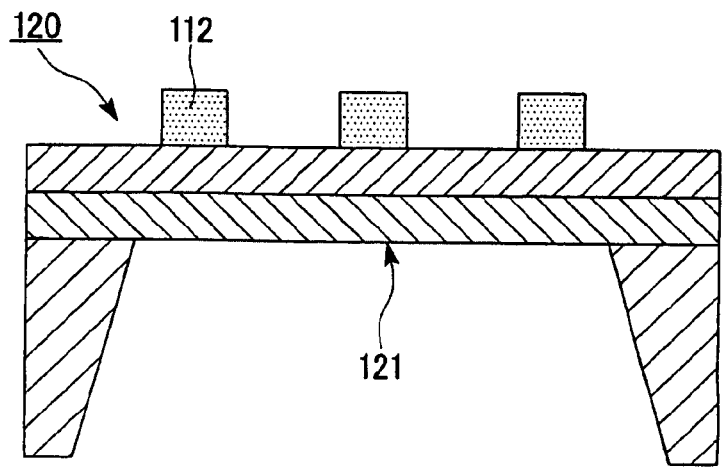

Then, as shown in FIG. 15B, a lower electrode 73 made of Pt is formed with a thickness of approximately 1000 Å on the second substrate 71c, where patterning of the electrode 73 is performed by a well-known photolithographic method. In this case, a film of a metal layer made of titanium, molybdenum, or the like may be pre-deposited on the second substrate 71c to increase adhesion to the second silicon substrate 71c used as a base member.

Figure 15C:
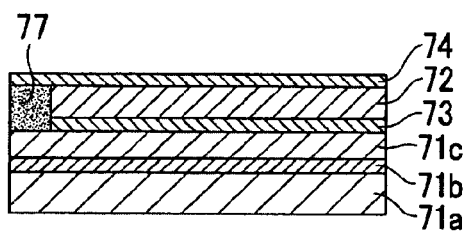

Next, as in FIG. 15C, a piezoelectric film 72, and then, an upper electrode 74 are formed sequentially in this order by a radio frequency (RF) sputtering method. For example, when using the piezoelectric film 72 made of AlN, the piezoelectric film 72 is deposited by discharging plasma onto a target member made of pure Al under a condition in which a gas flow amount ratio of $N_2$ and Ar inside a chamber is set to 1:1. Additionally, the upper electrode 74 made of pure Al is formed by sputtering under a gas atmosphere where only Ar gas is supplied into the chamber without supplying $N_2$ gas. Additionally, in a step of forming the piezoelectric film 72, at a portion where pattering/removal of the electrode 73 is performed by the photolithographic method, there is formed an amorphous AlN film 77 without piezoelectric properties.

In the present embodiment described above, the piezoelectric film 72 is made of AlN, the upper electrode 74 is made of pure Al, and the respective layers are deposited by reactive sputtering. However, the production method of the embodiment is not restricted to that. For example, the target member may be made of zinc (Zn), and inside the chamber may be provided an $O_2$ gas-containing atmosphere to switch on/off the supply of $O_2$ gas, thereby successively forming a piezoelectric film (ZnO) and an upper electrode (Zn).

Figure 15G:
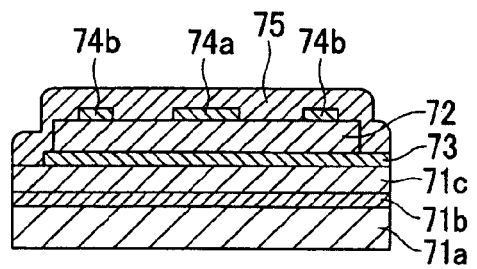
Figure 15D:
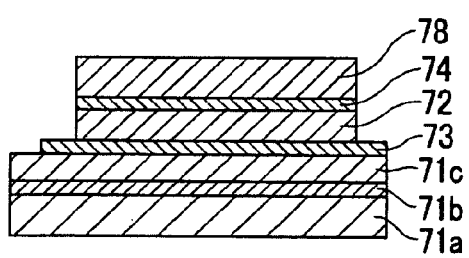

Next, as shown in FIG. 15D, using the photolithographic method, a patterning with a resist 78 is performed to remove a portion of the piezoelectric film 72 and a portion of the upper electrode 74 by etching. In that case, the etching performed in the embodiment is wet etching using an alkali solution (a tetramethyl ammonium hydroxide solution: 1 to 25%). Since AlN and pure Al are easily dissolved in alkali solutions, the piezoelectric film 73 and the upper electrode 74 are removed along a predetermined patterning, whereas the lower electrode 72 made of Pt remains unremoved.

Then, as shown in FIG. 11E, the resist 78 is removed.

Next, as in FIG. 15F, again, using photolithography with a resist 79, patterning of the upper electrode 74 and then removal by etching are performed to divide the upper electrode 74 into an approximately circular center electrode 74a and a ring-shaped outside electrode 74b. The outside electrode 74b is arranged to surround the center electrode 74a. In this case, also, wet etching with an alkali solution is performed. In the wet etching, alkali concentration is at a low level and an etching time is controlled, thereby enabling removal of only a portion of the upper electrode 74 as shown in the drawing. Additionally, instead of the wet etching using an alkali solution as above, there may be performed dry etching using a mixture gas of HBr and $Cl_2$.

Next, as shown in FIG. 15G, using the well-known CVD process, a cover layer 75 made of silicon oxide or silicon nitride is deposited so as to cover the respective layers formed on the second substrate 71b.

Figure 15H:
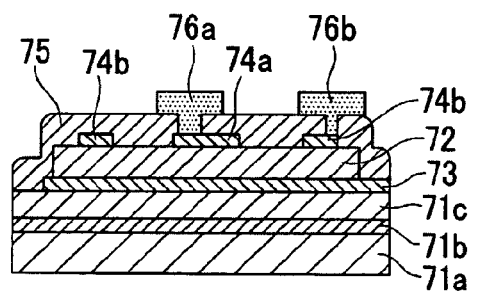
Figure 15E:
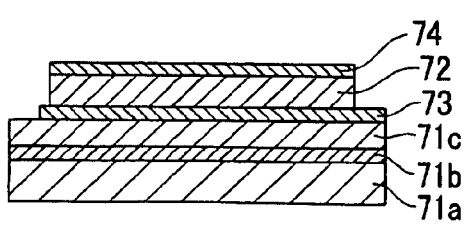

Then, as in FIG. 15H, a portion of the cover layer 75 is removed by dry etching to form a contact electrode 76a connected to the center electrode 74a and a contact electrode 76b connected to the outside electrode 74b.

Figure 15I:
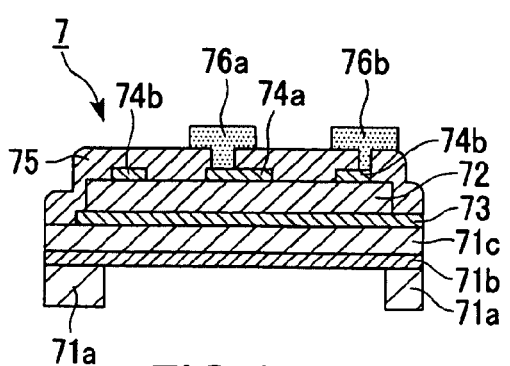

Finally, as in FIG. 15I, on a back surface of the first substrate 71a, deep etching is performed using a well-known deep reactive ion etching (RIE) method to open a sensing portion so as to expose the buried oxide film 71b at the opened portion. In this situation, since the buried oxide film 71b acts as an etching stopper, only the first substrate 71a can be removed by the etching, as well as the etching can be performed under appropriate control of film thickness.

Through the respective steps as above, the semiconductor pressure sensor 7 as in FIG. 15I can be obtained.

The method for producing a semiconductor pressure sensor according to the embodiment uses reactive sputtering to form the piezoelectric film. Thus, under control of crystal orientation, the piezoelectric film can be efficiently formed so as to have characteristic uniformity.

Additionally, when producing the semiconductor pressure sensor 1 as exemplified in FIG. 1 by using the production method of the embodiment, the buried insulating film 3 is used as the etching stopper to etch and remove the at least a portion of the region of the first substrate 21 corresponding to the region of the second substrate 22 including the piezoelectric film 4 and the electrodes 5. The method can improve controllability of thin-film thickness when the part of the first substrate 21 is removed by deep etching to form the diaphragm 6.

Semiconductor Device

Hereinafter will be described a semiconductor device according to an embodiment of the invention by referring to FIGS. 4A and 4B.

A semiconductor device 30 of the embodiment schematically includes a pressure sensor region A including a first substrate 31, a buried oxide film (a buried insulating film) 33 laminated on the first substrate 31, a second substrate 32 laminated on the buried oxide film 33, a plurality of electrodes 5 including a lower electrode 36 and at least two upper electrodes 37, the lower electrode being formed on the second substrate 32, a piezoelectric film laminated on the lower electrode and having the upper electrodes 37 formed thereon, in which there is removed at least a portion of a region of the first substrate 31 corresponding to a region of the second substrate 32 including the piezoelectric film 34 and the electrodes 35; and a CMOS circuit (a semiconductor circuit) 38 formed on the buried oxide film 33, the CMOS circuit 38 being electrically connected to each of the electrodes 35 to detect pressure applied to the piezoelectric film 34 so as to output a pressure detection signal.

Additionally, in the semiconductor device 30 exemplified in the drawings, the upper electrodes 37 includes a center electrode 37a provided at an approximately center of an electrode-forming region E on the piezoelectric film 34 and an outside electrode 37b spaced apart from the center electrode 37a to be formed in a ring shape so as to surround the center electrode 37a.

As in the above-described structure, in the semiconductor device 30 of the embodiment, the piezoelectric film 34 and the electrodes 35 are located on and above the second substrate 32, and there is removed the at least a portion of the region of the first substrate 31 corresponding to the region of the second substrate 32 including the piezoelectric film 34 and the electrodes 35. Specifically, in the semiconductor device 30 shown in FIG. 4A, the removed portion of the first substrate 31 corresponds to entire sizes of the piezoelectric film 34 and the second substrate 32. The removed portion is formed as a thin-film diaphragm 39 including the buried oxide film 33 and the second substrate 32, thereby providing the pressure sensor region A similar to the semiconductor pressure sensor 1 of the first embodiment described above.

In addition, the first and the second substrates 31, 32, the buried oxide film 33, the piezoelectric film 34, and the electrodes 35 included in the pressure sensor region A of the semiconductor device 30 of the embodiment can be formed of the same materials and in the same manner as in the semiconductor pressure sensor 1 of the first embodiment.

Furthermore, the semiconductor device 30 of the embodiment also includes the CMOS circuit 38 on the buried oxide film 3. The CMOS circuit 38 has the same circuit as the detection circuit 9 shown in FIGS. 3A and 3B and is electrically connected to the respective electrodes via a not-shown wiring means.

The semiconductor device 30 of the embodiment further includes a cover layer 37 made of silicon oxide or silicon nitride formed on the buried oxide film 33, except for a region of the film 33 where the CMOS circuit 38, the second substrate 32, and the respective upper layers on and above the substrate 32 are arranged.

The semiconductor device 30 of the embodiment includes the pressure sensor region A, in which the piezoelectric film 34 and the electrodes 35 are laminated on or above the second substrate 32, the electrodes 35 including the lower electrode 36 formed on the second substrate 32 and the center electrode 37a and the outside electrode 37b formed on the piezoelectric film 34 on the lower electrode 36; and there is removed the at least a portion of the region of the first substrate 31 corresponding to the region of the second substrate 32 including the piezoelectric film 34 and the electrodes 35. The structure allows detecting potential change in the piezoelectric film 34 based on two different piezoelectric capacitances, thereby reducing power consumption and improving pressure detection sensitivity.

Additionally, since the CMOS circuit 38, which detects pressure applied to the piezoelectric film 34, is formed on the buried oxide film 33, the buried oxide film 33 acts as the etching stopper. Thereby, the at least a portion of the region of the first substrate 31 can be removed by etching after forming the piezoelectric film 34 and the electrodes 35 included in the pressure sensor region A and the CMOS circuit 38. Accordingly, the production process of the device can be facilitated.

Consequently, there can be obtained a semiconductor device that can achieve power consumption reduction, improvement in pressure detection sensitivity, and facilitation of production process.

In the semiconductor device 30 shown in FIGS. 4A and 4B, there is removed only the corresponding portion of the first substrate 31 in the region where the piezoelectric film 34 and the electrodes 35 are arranged. However, the structure of the embodiment is not restricted to that. For example, parts of at least the buried oxide film 33 and the second substrate 32 may be removed in the region having the piezoelectric film 34 and the electrodes 35.

Furthermore, on the piezoelectric film 34 of the semiconductor device 30 shown in the drawings, the ring-shaped outside electrode 37b is provided at a single location so as to surround the center electrode 37a. As an alternative structural example, there may be provided a plurality of outside electrodes to surround the center electrode 37a.

Electronic Apparatus

Next will be described an electronic apparatus according to an embodiment of the invention.

The electronic apparatus of the embodiment includes the above-described semiconductor pressure sensor of any of the embodiments or the above-described semiconductor device of the embodiment. A specific example of the electronic apparatus is shown in FIG. 16. A watch-type electronic apparatus 80 in FIG. 16 has a main body 81 that includes the semiconductor pressure sensor according to any of the embodiments. Accordingly, the electronic apparatus 80 can be easily produced in a compact size and can exhibit improved performance characteristics.

While the embodiment has exemplified the watch-type electronic apparatus as the electronic apparatus according to the embodiment, the electronic apparatus of the embodiment is not restricted to the watch-type electronic apparatus 80 of FIG. 16. The semiconductor pressure sensors according to the embodiments can be suitably applied to various electronic apparatuses.

In addition, it should be noted that a technological scope of the invention is not restricted by the embodiments described above, and various alterations and modifications may be added in a range without departing from the spirit of the invention.

What is claimed is:

1. A semiconductor pressure sensor, comprising:
   a first substrate;
   a buried insulating film laminated on the first substrate;
   a second substrate laminated on the buried insulating film;
   a plurality of electrodes including a lower electrode and at least two upper electrodes, the lower electrode being formed on the second substrate; and
   a piezoelectric film laminated on the lower electrode and having the upper electrodes formed thereon,
   wherein there is removed at least a portion of a region of the first substrate corresponding to a region of the second substrate including the piezoelectric film and the electrodes.

2. The semiconductor pressure sensor according to claim 1, wherein the upper electrodes include a center electrode disposed at an approximately center position of an electrode-forming region on the piezoelectric film and an outside electrode spaced apart from the center electrode to be formed so as to surround the center electrode.

3. The semiconductor pressure sensor according to claim 2, wherein the outside electrode includes a plurality of outside electrodes.

4. The semiconductor pressure sensor according to claim 2, wherein the outside electrode is formed in a ring shape.

5. The semiconductor pressure sensor according to claim 1, wherein the first and the second substrates are made of silicon or a semiconductor material similar to silicon.

6. The semiconductor pressure sensor according to claim 1, wherein the buried insulating film is a silicon oxide film or a semiconductor oxide film similar to the silicon oxide film.

7. An electronic apparatus including the semiconductor pressure sensor according to claim 1.

8. A semiconductor device, comprising:
   a pressure sensor region including a first substrate, a buried insulating film laminated on the first substrate, a second substrate laminated on the buried insulating film, a plurality of electrodes including a lower electrode and at least two upper electrodes, the lower electrode being formed on the second substrate, and a piezoelectric film laminated on the lower electrode and having the upper electrodes formed thereon, wherein there is removed at least a portion of a region of the first substrate corresponding to a region of the second substrate including the piezoelectric film and the electrodes; and
   a semiconductor circuit formed on the buried insulating film, the semiconductor circuit being electrically connected to each of the electrodes to detect pressure applied to the piezoelectric film so as to output a pressure detection signal.

9. The semiconductor device according to claim 8, wherein the upper electrodes include a center electrode disposed at an approximately center position of an electrode-forming region on the piezoelectric film and an outside electrode spaced apart from the center electrode to be formed so as to surround the center electrode.

10. The semiconductor device according to claim 9, wherein the outside electrode includes a plurality of outside electrodes.

11. The semiconductor device according to claim 9, wherein the outside electrode is formed in a ring shape.

12. The semiconductor device according to claim 8, wherein the first and the second substrates are made of silicon or a semiconductor material similar to silicon.

13. The semiconductor device according to claim 8, wherein the buried insulating film is a silicon oxide film or a semiconductor oxide film similar to the silicon oxide film.

14. An electronic apparatus including the semiconductor pressure sensor according to claim 8.

* * * * *